(12) United States Patent
Abramskiehn et al.

(10) Patent No.: US 9,037,170 B2
(45) Date of Patent: May 19, 2015

(54) MANAGEMENT OF AN ELECTRONIC CALENDAR USING SHORT MESSAGE SERVICE (SMS)

(71) Applicant: INTERNATIONAL BUSINESS MACHINES CORPORATION, Armonk, NY (US)

(72) Inventors: Dario R. Abramskiehn, New York, NY (US); John R. Dingler, Dallas, GA (US); Blaine H. Dolph, Western Springs, IL (US); Kelly E. Songer, New York, NY (US); Matthew B. Trevathan, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 226 days.

(21) Appl. No.: 13/644,270

(22) Filed: Oct. 4, 2012

(65) Prior Publication Data
US 2014/0099980 A1   Apr. 10, 2014

(51) Int. Cl.
*H04W 4/00*   (2009.01)
*G06Q 10/10*   (2012.01)
*H04L 12/58*   (2006.01)
*H04M 1/725*   (2006.01)
*H04W 4/14*   (2009.01)

(52) U.S. Cl.
CPC ............ *H04L 51/38* (2013.01); *G06Q 10/10* (2013.01); *H04M 1/72552* (2013.01); *H04M 1/72566* (2013.01); *H04W 4/14* (2013.01)

(58) Field of Classification Search
CPC .......... H04W 4/14; H04W 8/24; H04W 8/245
USPC ............ 455/466, 418–420, 556.2; 705/7.18, 705/7.24
See application file for complete search history.

(56) References Cited

U.S. PATENT DOCUMENTS

| | | |
|---|---|---|
| 2007/0050371 A1 | 3/2007 | Johnson et al. |
| 2008/0085728 A1 | 4/2008 | Reding et al. |
| 2008/0102889 A1* | 5/2008 | May et al. .................. 455/556.2 |
| 2010/0069054 A1* | 3/2010 | Labidi et al. .................. 455/418 |
| 2011/0252351 A1 | 10/2011 | Sikora et al. |

OTHER PUBLICATIONS

"Google Calendar and SMS", http://support.google.com/calendar/bin/topic.py?hl=en&topic=1672522&from=15309&rd=1, Last Download Date: Oct. 3, 2012, 1 page.

* cited by examiner

*Primary Examiner* — Marcos Torres
(74) *Attorney, Agent, or Firm* — Matthew Chung; Roberts Mlotkowski Safran & Cole, P.C.

(57) ABSTRACT

Approaches are provided for managing an electronic calendar using short message service (SMS). Specifically, an approach is provided that is implemented in a computer infrastructure having computer executable code tangibly embodied on a computer readable storage medium having programming instructions operable to receive an SMS text message including an SMS command to manage an electronic calendar with at least one pre-existing event. The SMS command includes an instruction to modify the at least one pre-existing event. The programming instructions are further operable to execute the SMS command such that the at least one pre-existing event is modified.

19 Claims, 5 Drawing Sheets

US 9,037,170 B2

MANAGEMENT OF AN ELECTRONIC CALENDAR USING SHORT MESSAGE SERVICE (SMS)

FIELD OF THE INVENTION

The present invention generally relates to electronic data management using mobile communication technologies, and more particularly, to a method and system for managing an electronic calendar using short message service (SMS).

BACKGROUND

Electronic calendaring systems have transformed personal and business time management. In particular, calendaring software has become a standard feature on many computing devices, such as personal computers, personal digital assistants (PDAs), enterprise digital assistants (EDAs), and smartphones (e.g., a mobile phone with a mobile computing platform). The calendaring software employed on many of these devices generally provides users with an electronic version of the traditional paper calendar and may enable a user to synchronize with an online storage of calendar events such that all of a user's devices are updated with the same calendar information. These devices have evolved over time and eased the process of recording and providing the ability to share events.

Several different methods are available to access and manage electronic calendaring systems. Typically, these methods include either directly accessing the calendaring software on a personal computer, PDA, EDA, or smartphone, or indirectly accessing the calendaring software using remote access through the Internet or an intranet. However, such methods where the calendaring software is accessed directly or indirectly via personal computers, mobile devices with mobile computing platforms, the Internet, or the intranet have proven insufficient when dealing with scenarios where users are mobile and Internet access is unreliable or unattainable. In real world scenarios, many users do not always have access to their personal computer, the Intranet, or an intranet, or have access to a mobile device with a mobile computing platform.

SUMMARY

In a first aspect of the invention, a method is provided that is implemented in a computer infrastructure having computer executable code tangibly embodied on a computer readable storage medium having programming instructions operable to receive an SMS text message including an SMS command to manage an electronic calendar with at least one pre-existing event. The SMS command includes an instruction to modify the at least one pre-existing event. The programming instructions are further operable to execute the SMS command such that the at least one pre-existing event is modified In another aspect of the invention, a system implemented in hardware is provided including a calendar manager tool implemented on a processor and configured to receive an SMS text message including an SMS command to manage an electronic calendar with at least one pre-existing event. The SMS command includes an instruction to at least one of: cancel the at least one pre-existing event, reschedule the at least one pre-existing event, open a line to the at least one pre-existing event, and dial into the at least one pre-existing event. The calendar manager tool is further configured to execute the SMS command such that the at least one pre-existing event is at least one of: removed from the electronic calendar, the at least one pre-existing event is rescheduled, the line to the at least one pre-existing event is opened, and a user is dialed into the at least one pre-existing event.

In an additional aspect of the invention, a computer program product including a computer usable storage medium having readable program code embodied in the medium is provided. The computer program product includes at least one component operable to receive an SMS text message including an SMS command to manage an electronic calendar, wherein the SMS command includes an instruction to cancel, reschedule, or dial into at least one pre-existing event in the electronic calendar. The at least one component is further operable to execute the SMS command such that the at least one pre-existing event is canceled, rescheduled, or dialed into.

In a further aspect of the invention, a computer system for managing an electronic calendar using SMS, the system includes a CPU, a computer readable memory and a computer readable storage media. Additionally, the system includes first program instructions to receive an SMS text message including an SMS command to manage an electronic calendar with at least one pre-existing event, wherein the SMS command includes an instruction to modify the at least one pre-existing event. The system further includes second program instructions to execute the SMS command such that the at least one pre-existing event is modified in accordance with the instruction. The first and second program instructions are stored on the computer readable storage media for execution by the CPU via the computer readable memory.

In yet another aspect of the invention, a method is provided for deploying a system for managing an electronic calendar using SMS. The method includes providing a computer infrastructure. The computer infrastructure is operable to receive an SMS text message includes an SMS command to manage an electronic calendar. The SMS command includes an instruction to cancel, reschedule, or dial into at least one pre-existing event in the electronic calendar. The computer infrastructure is further operable to execute the SMS command such that the at least one pre-existing event is canceled, rescheduled, or dialed into.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
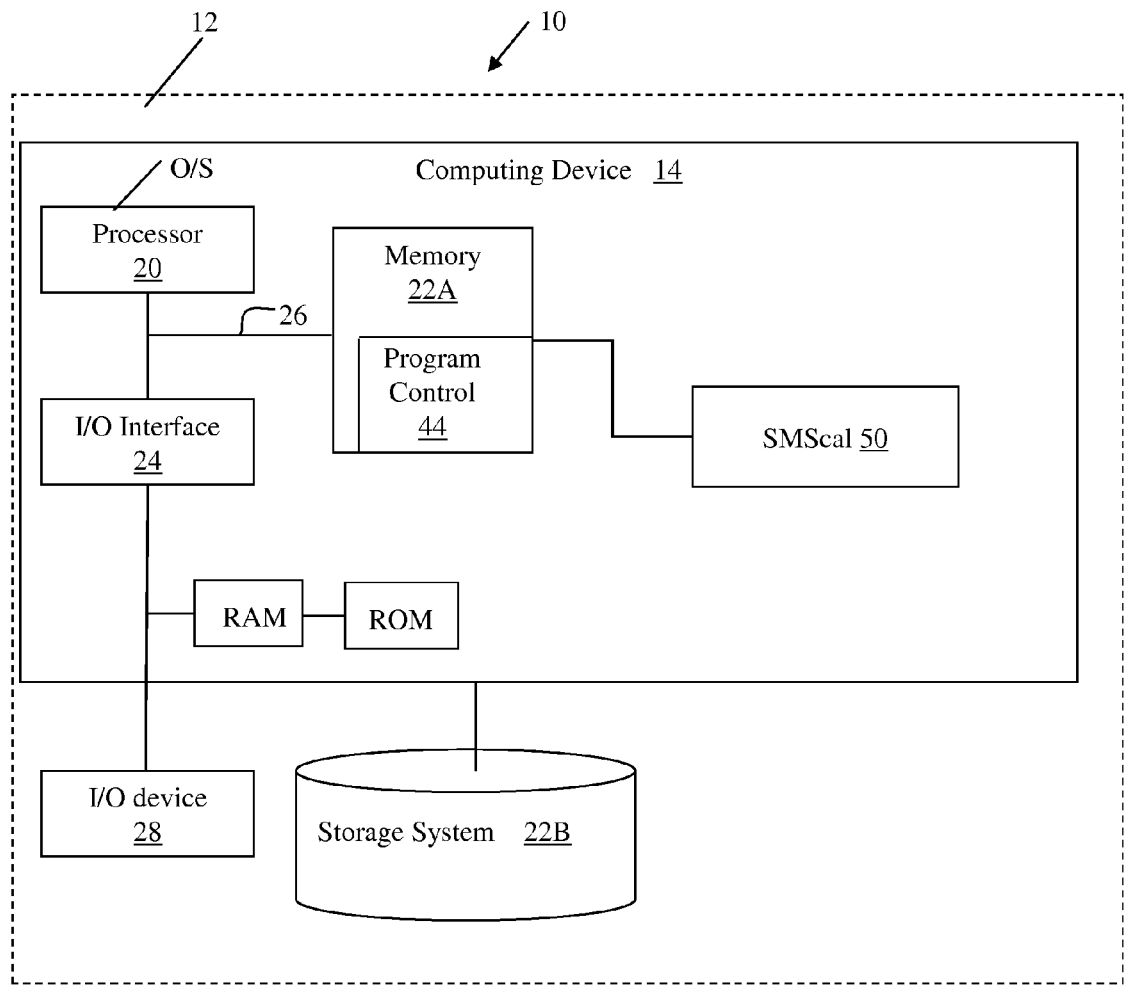
FIG. 1 shows an illustrative environment for implementing processing steps in accordance with aspects of the invention.

The present invention generally relates to electronic data management using mobile communication technologies, and more particularly, to a method and system for managing an electronic calendar using short message service (SMS). According to aspects of the invention, a calendar management system provides users with functionality to cancel, reschedule, and dial into pre-existing events in their electronic calendars (e.g., Lotus Notes®, which is a trademark of International Business Machines Corporation registered in many jurisdictions worldwide) through SMS.

SMS is a service available on mobile telephones and other mobile devices that permits the sending of short messages, e.g., text messaging. The term text messaging and its variants are commonly used to describe SMS. Text messages may also be used to interact with automated systems, such as ordering products and services or participating in contests or polls. In practice, SMS messages are sent with a forward_short_message, whose payload length is limited by the constraints of the signaling protocol to 140 bytes (140 bytes=140*8 bits=1120 bits). This translates to 160 7-bit characters, 140 8-bit characters, or 70 16-bit characters. However, larger messages can be segmented over multiple messages, in which case the receiving party is responsible for reassembling the message.

The transmission of the short messages via SMS can be performed through different protocols such as SS7 (Signaling System No. 7) within the standard global system for mobile communications and mobile application part (GSM MAP). Specifically, SS7 is a set of telephony signaling protocols used by the telephone network to exchange information. That is, SS7 provides a universal structure for telephony network signaling, messaging, interfacing, network maintenance, establishment of a call, exchanging user information, call routing, billing structures, and supporting Intelligent Network (IN) services, amongst other functions. According to aspects of the invention, SS7 messages may be used to interact with a user's electronic calendaring software and communicate with contacts such as meeting participants or invitees.

In embodiments, a user that does not have direct or indirect access to their electronic calendar via their personal computer, the Internet, the intranet, or a smartphone can take advantage of SS7 messages or SMS to make changes to an event while traveling or running late for a meeting, as examples. For example, a moderator or host of a meeting that anticipates joining a meeting belatedly can open the meeting via SMS with his/her moderator or host code for participants to begin the meeting without the moderator's attendance. Advantageously by providing these electronic calendar functionalities in real-time and pairing them with the ability to communicate valuable information to event participants in real-time via SMS, the methods and systems of the present invention help to facilitate better organization and communication in ways that previous systems and methods have not attempted.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can include any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an SMS calendar manager tool 50 (SMScal) that is configured to execute the processes described herein. The SMScal 50 can be implemented as one or more program code in the program control 44 stored in memory 22A as separate or combined modules. Additionally, the SMScal 50 may be implemented as separate dedicated processors or a single or several processors to provide the function of the tool.

In embodiments, the SMScal 50 may be configured to receive an SMS text message including an SMS command to modify at least one pre-existing event in a user's electronic calendar, and execute the SMS command to modify the pre-existing event. For example, in accordance with aspects of the invention, the SMScal 50 can cancel the pre-existing event, reschedule the pre-existing event, open a line to the pre-existing event, or dial into the pre-existing event. In embodiments, the SMScal may be further configured to send an update SMS text message or update voice message to participants of the pre-existing event such that the participants are informed of the modification, e.g., the cancellation of the pre-existing event, the rescheduling of the pre-existing event, or the line being opened for the pre-existing event.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can include any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 includes two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can include any combination of wired and/or wireless links; any combination of one or more types of networks (e.g., the Internet, a wide area network, a local area network, a virtual private network, etc.); and/or utilize any combination of transmission techniques and protocols.

Figure 2:
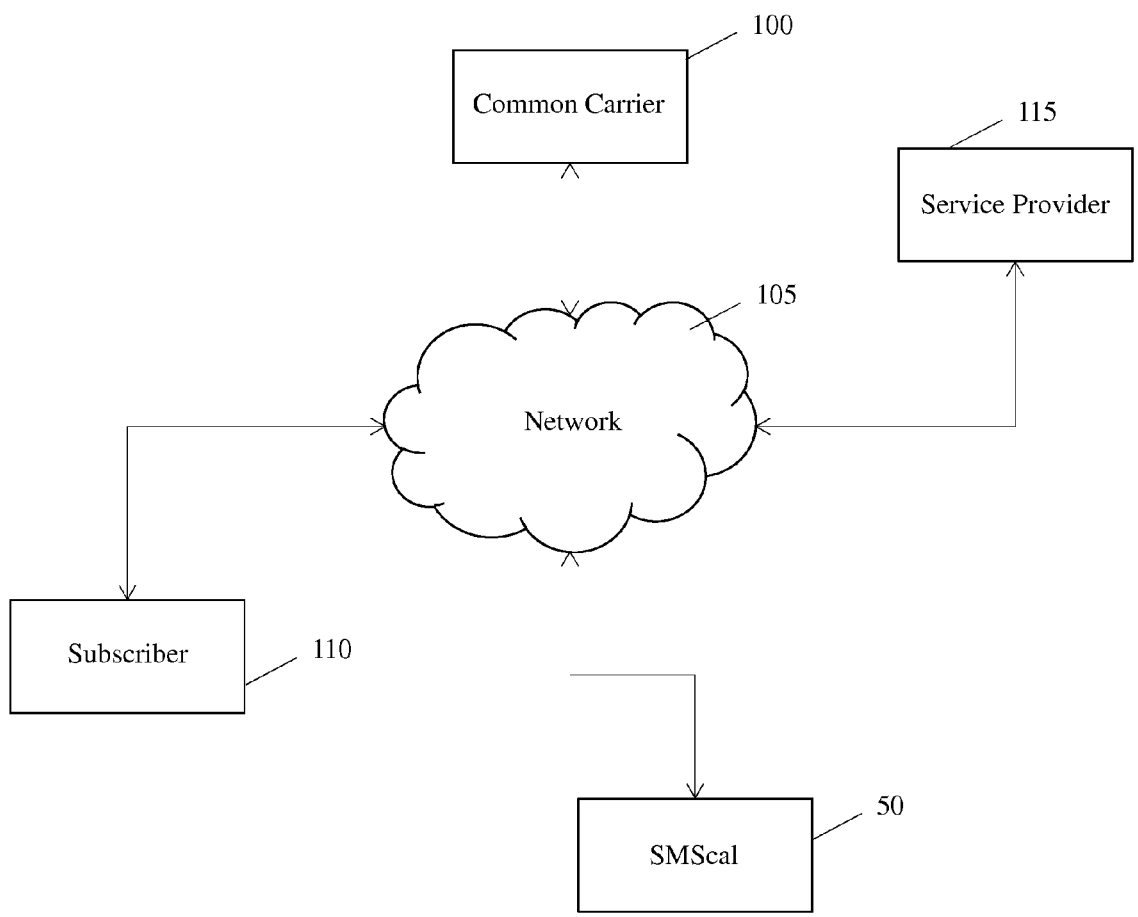
FIG. 2 shows an illustrative environment for implementing processing steps in accordance with aspects of the invention.

FIG. 2 shows an exemplary context suitable for application of the present invention. As shown in FIG. 2, a common carrier 100 provides communication service over a public network 105 connecting a subscriber or user 110 (e.g., a mobile device of a subscriber or user), a service provider 115 (e.g., a server of the service provider), and a SMScal 50. In embodiments, the SMScal 50 is a program or module (as described above with respect to FIG. 1) provided by the service provider 115 that is downloaded or accessed via a computing device 14 (as described above with respect to FIG. 1) of the subscriber or user 110. In embodiments, the user may install and/or configure the SMScal 50 directly on the user's computing device 14 or the user may access the SMScal 50 indirectly using the user's computing device 14, e.g., the SMScal 50 may be accessed via cloud computing. For example, the user may access the SMScal 50 (i.e., a cloud application) through a web browser or a light-weight desktop or mobile application while the business software and user's data are stored on servers at a remote location.

Only one subscriber or user 110 and one corresponding SMScal 50 are shown in the interest of descriptive clarity; however, the invention applies, of course, to any number of subscribers or users 110 and corresponding SMScals 50. As should be understood by one of ordinary skill in the art, the common carrier 100 and the service provider 115 may be the same entity in accordance with aspects of the present invention.

In this example, which will be used throughout to illustrate but not limit the present invention, the common carrier 100 may be, for example, a provider of cellular telephone service who offers wireless text messaging such as SMS. The subscriber or user 110 may be, for example, a consumer (e.g., any business or person that uses technology) who establishes a service account with the common carrier 100 for the purpose of receiving communication services such as cellular telephone service and SMS, and who establishes a service account with the service provider 115 for the purpose of receiving electronic calendar management services such as access to calendar management functionality provided by the SMScal 50.

The service provider 115 may be a Solution Integrator that offers to perform the processes described herein. In embodiments, the service provider 115 can create, maintain, deploy, support, etc., the computer infrastructure that performs the process steps of the invention for one or more subscribers 110 (e.g., users). For example, the service provider 115 can deploy the SMScal 50 program or module. In return, the service provider 115 can receive payment from the subscriber(s) 110 under a subscription and/or fee agreement and/or the service provider 115 can receive payment from the sale of advertising content to one or more third parties.

The service provider 115 gathers information from the subscriber or user 110. This information may be gathered at the time the subscriber or user 110 signs on for service with the service provider 115. As part of establishing a service account, the service provider 115 may provide the subscriber or user 110 with access to the SMScal 50. In embodiments, the SMScal 50 may be configured to receive an SMS text message including an SMS command to modify a pre-existing event on an electronic calendar of the subscriber or user 110, and execute the SMS command to modify the pre-existing event. For example, in accordance with aspects of the invention, the SMScal 50 can cancel or reschedule the pre-existing event, open a line to the pre-existing event, dial into the pre-existing event, or send an update SMS text message or update voice message to participants of the pre-existing event such that the participants are informed of the cancelation or rescheduling of the pre-existing event, or the line being opened for the pre-existing event.

Flow Diagram

Figure 3:
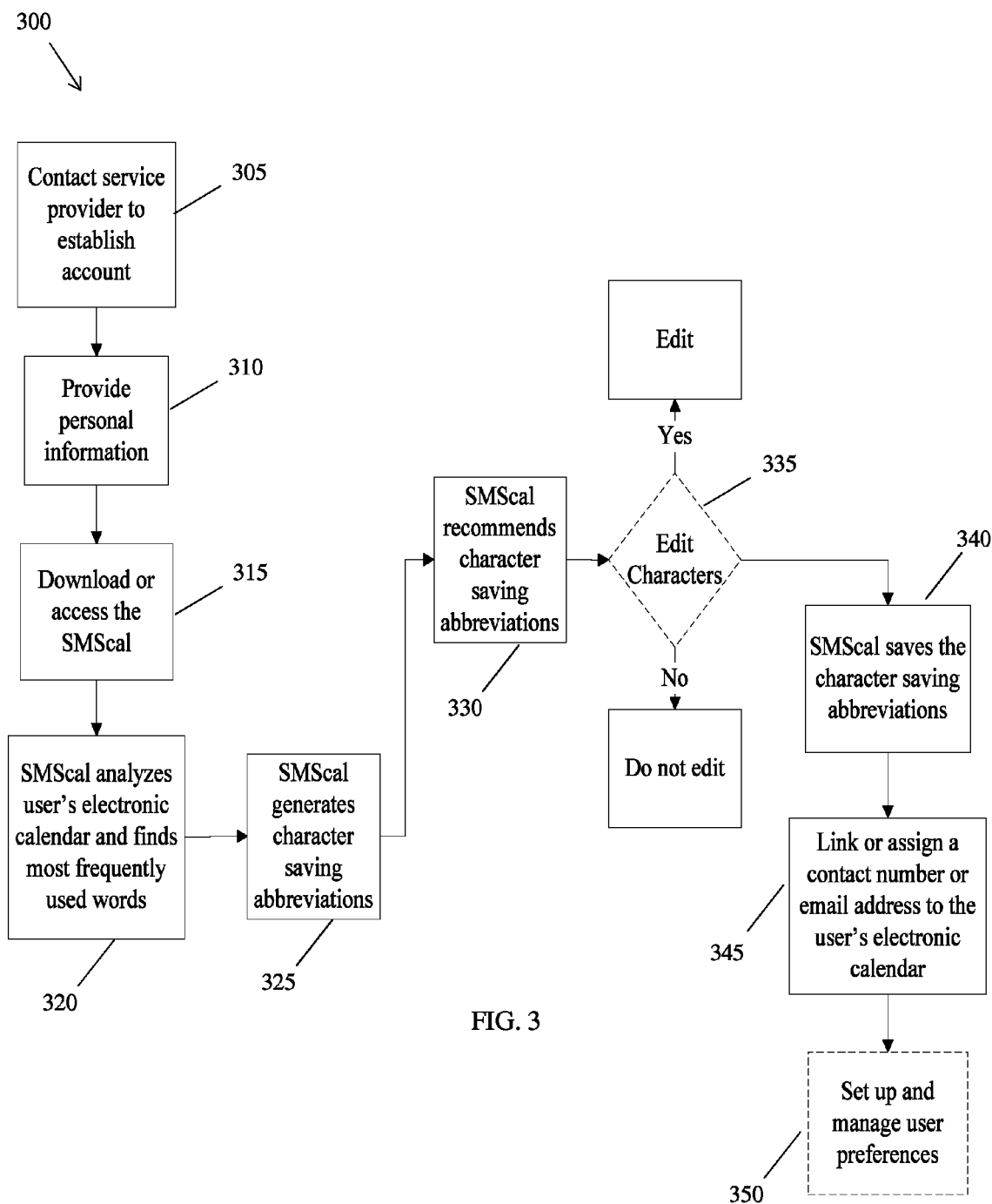
FIG. 3 shows an exemplary flow in accordance with aspects of the invention.
Figure 4:
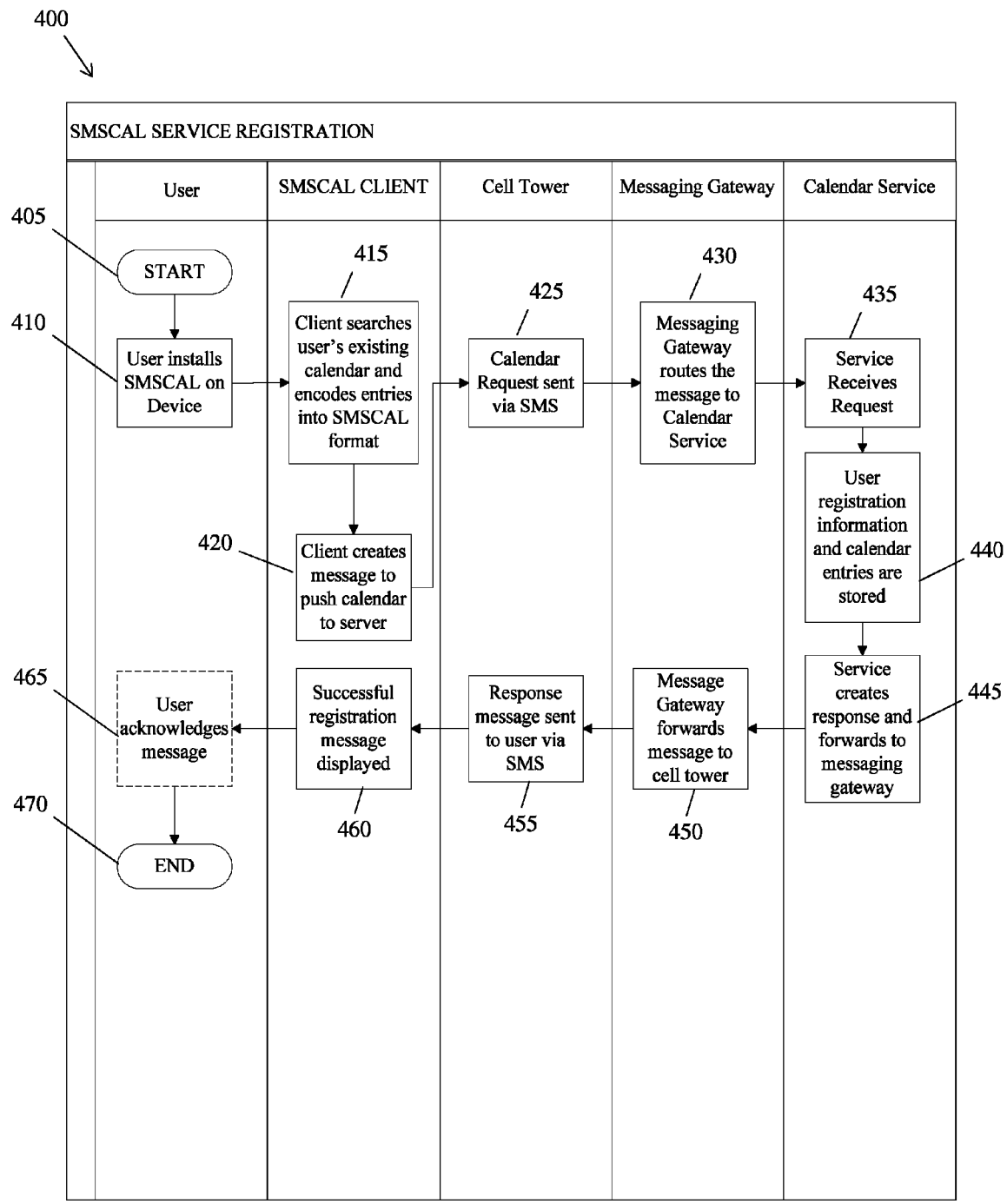
FIG. 4 shows an exemplary swim lane diagram in accordance with aspects of the present invention.
Figure 5:
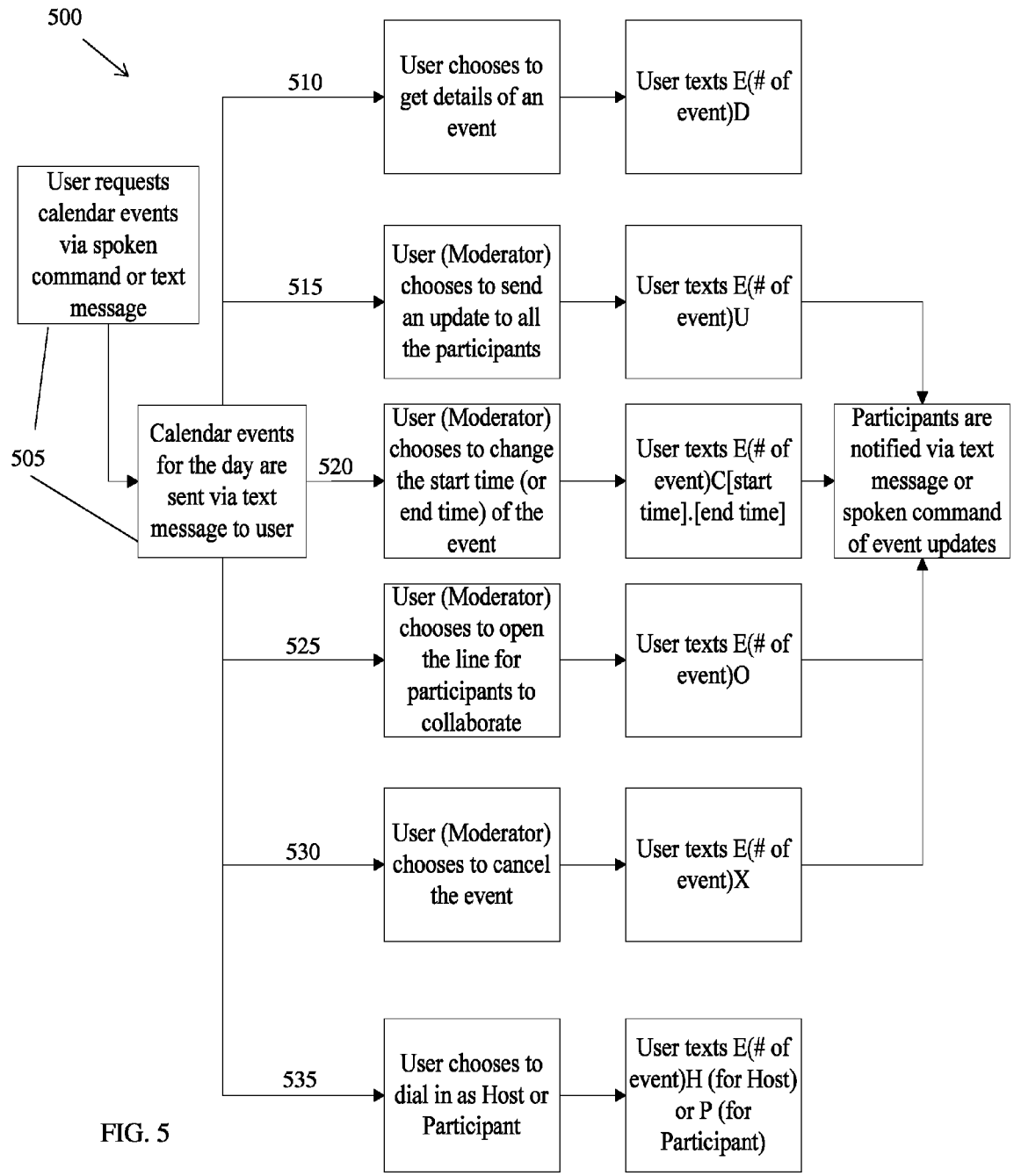
FIG. 5 shows an exemplary flow in accordance with aspects of the invention.

FIGS. 3-5 show exemplary flows for performing aspects of the present invention. The steps of FIGS. 3-5 may be implemented in the environments of FIGS. 1 and 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow 300 for a process of establishing service for use of the calendar management system in accordance with aspects of the present invention. As shown in FIG. 3, at step 305, the user contacts the service provider to establish a service account. At step 310, at this time, or later, or earlier in preparation, the service provider collects elements of personal information about the user. Exemplary elements of personal information may include names, addresses, dates of birth, methods of payment, user's mobile device contact number (i.e., phone number), type of electronic calendar used, and a wide variety of other information. Although the invention is described here in the context of SMS and written language that may be displayed to the user, the elements of personal information are not so limited, and may also include special characters, images, pointers to other information such as uniform resource locators, and so forth.

At step 315, the user downloads or accesses the calendar management system (e.g., SMScal 50 as discussed above with reference to FIGS. 1 and 2). At step 320, the SMScal analyzes the user's electronic calendar and generates a list of most frequently used or common words found within the electronic calendar that the SMScal might use to communicate information regarding events on the user's electronic calendar to the user via text messages. In embodiments, the SMScal generates a list of a top number (e.g., twenty) of most frequently used or common words found in the user's electronic calendar entries. At step 325, the SMScal constructs a table that associates character saving abbreviations with each of the most frequently used or common words found in the user's electronic calendar. For example, the SMScal may determine and generate the following information as shown in Table 1:

TABLE 1

| | |
|---|---|
| The entry "meeting" occurs 600 times | Abbreviation = Mtg |
| The entry "daily" occurs 241 times | Abbreviation = Dy |
| The entry "review" occurs 55 times | Abbreviation = Rw |

At step 330, the SMScal recommends to the user the particular character saving abbreviations for each of the most frequently used or common words found in the user's electronic calendar entries. Optionally at step 335, the user may edit and customize the suggested abbreviations to use something that may be more intuitive to the user. For example, the user may change "Mtg" to "Meet." In embodiments, the user may download or alter the abbreviations at a later time via the network, or the user may download or alter the abbreviations from a personal computer, for example by visiting an appropriate Internet web site, as examples. At step 340, the table and abbreviations are saved for later use by the SMScal to communicate information regarding events on the user's electronic calendar to the user via text messages.

At step 345, a contact number or email address is linked or assigned to the user's electronic calendar and/or SMScal such that the user can use their mobile device (e.g., cell phone) to send SMS command(s) to the assigned contact number or email address. This allows the user to manage the user's electronic calendar and receive information from the SMScal regarding events on the user's electronic calendar. For example, the character saving abbreviations may be used in combination with predefined SMS command(s) to provide the user with functionality to cancel, reschedule, and dial into pre-existing events in their electronic calendar using text messages from their mobile device. Provided hereafter are a number of exemplary SMS commands, which will be used throughout as a running example to illustrate but not limit the present invention. For example, the SMS command(s) may include the following information as shown in Table 2:

TABLE 2

| 1. Retrieve a day's calendar events. | Events |
| 2. Get details of an event. | d |
| 3. Send an event message or update to all participants. | u |
| 4. Change the start and/or end time of an event. | c start and/or c end |
| 5. Open the event to allow it to begin with a moderator code. | o |
| 6. Cancel an event. | x |
| 7. Dial into an event as either the host or participant. | h or P |

Optionally at step 350, the user may set up and manage user preferences for the SMScal. In embodiments, the preferences set and edited may include by non-limiting example: the number of maximum texts that the SMScal may send to the user in a day; preferred time and date formats; the number of maximum texts that may be used by the SMScal to send details of a calendar event; security features including passwords and user names for accessing the SMScal; the time of day in which texts may be sent by the SMScal, etc.

FIG. 4 depicts an exemplary swim lane diagram 400 showing processing steps in accordance with aspects of the present invention. More specifically, FIG. 4 shows a flow for a process of establishing service for use of the calendar management system in accordance with aspects of the invention, with five players: a subscriber or user, SMScal client (e.g., SMScal 50), cell tower, messaging gateway, and a calendar service (e.g., service provider). As shown in FIG. 4, at step 405, the registration process starts. At step 410, the registration process is initiated by the user installing and/or configuring the SMScal client on a computing device. At step 415, the SMScal client searches the user's electronic calendar, generates a list of most frequently used or common words found within the electronic calendar, and encodes the most frequently used or common words into SMScal format (e.g., generates character saving abbreviations). In this way, the SMScal may use the encoded words to communicate information regarding calendar events to the user.

At step 420, the SMScal client creates an SMS message to push the user's calendar events to a server of the calendar service. At step 425, a calendar service request is sent from the SMScal client to the calendar service requesting electronic calendar management service, e.g., the service request may be sent via SMS. At step 430, the messaging gateway routes the calendar service request to the calendar service. At step 435, the calendar service receives the calendar service request. At step 440, the calendar service stores user registration information and calendar entries. In embodiments, the user registration information and calendar entries may be stored locally or remotely. At step 445, the calendar service creates a response to the calendar service request and forwards the response to the messaging gateway. At step 450, the messaging gateway forwards the response to the cell tower. At step 455, the cell tower forwards the response to the user via SMS. At step 460, the SMScal client receives and displays an indication of successful registration. Optionally, at step 465, the user acknowledges the response sent via SMS to the user. At step 470, the registration process ends.

FIG. 5 depicts an exemplary flow 500 for a process of a user sending SMS commands to manage a user's electronic calendar in accordance with aspects of the present invention. As shown in FIG. 5, at step 505, the user contacts the SMScal using the assigned contact number or email address and requests the user's electronic calendar events (e.g., all of the current day's events). Specifically, the user may send a text command to the contact number or email address that requests the SMScal to forward the user's electronic calendar events (e.g., the default may be set to current day's events but the user may be able to specify a different day's events) to the user's mobile device. For example, retrieving the current day's calendar may include the user texting "events" to the contact number or email address assigned to the user's SMScal, and the SMScal texts back to the user's mobile device the current day's events for the user's electronic calendar. In embodiments, this step may be a prerequisite for every other command.

The events received from the SMScal may be displayed on the user's mobile device and designated using a combination of alpha and/or numeric characters, e.g., the current day's events may be designated E1, E2, and so forth. The day's events may be displayed on the user's mobile device in a specified order, e.g., chronological order in the day. In embodiments, an exemplary display on the user's mobile device may include:

E1=Patent Rw Mtg@9 am (meaning first event of the day is "Patent Review Meeting" at 9 am)

E2=Client Dy Cpt@10:45 am (meaning the second event of the day is "Client Daily Checkpoint" at 10:45 am)

E3=Wy Tm Dinner@5:45 pm (meaning the third event of the day is "Weekly Team Dinner" at 5:45 pm)

In order for the user to retrieve a different day's events, the user may text "events [mm.dd.yy]" to retrieve events from another day (either in the future or the past), again with numbering beginning E1, E2, . . . and so on, for that day's chronology.

In accordance with aspects of the invention, if events are added to the user's electronic calendar during the day, the user can re-request an update of their day's events on the calendar by again texting "events" to the SMScal. In embodiments, the SMScal may be configured to push notifications or updates of calendar changes by text message to the user's mobile device without the need for the user to request such updates. The older events of the day may retain their same number (e.g., E1, E2, E3, etc.), while new events may be listed as E1a (if the new event occurs between original events E1 & E2), E4a (between original events E4 and E5), etc., based on chronology. In additional embodiments of the present invention, the user may call the assigned contact number and verbally request the SMScal to forward the calendar events to the user's mobile device.

Once the user has received their day's events, at steps 510-535, the user may use the received event designations (e.g., E1, E2, E3, etc.) in combination with the variety of SMS commands (discussed above with respect to Table 2) to manage their electronic calendar via text messages. Specifically, at step 510, the user may choose to obtain details of an event(s). For example, the user may text the SMS command "E2d" to request that the SMScal send the location of a specified event (e.g., event E2), along with description information. In embodiments, the default setting for the SMScal may be for the SMScal to send up to two texts (e.g., 320 7-bit characters) worth of event description to the user's mobile device. The user may also be able to send the text command "E2dall" to request that the SMScal send the location of a specified event, all participants, and the entire event description regardless of the number of characters (and/or texts) required to do so.

At step 515, the user may choose to send an update of an event to all participants or invitees of the event. For example, the user may text the SMS command "E2u [message text]" to request that the SMScal send a text message to all of the attendees (or all of the invitees) of a specified event (e.g., event E2). In accordance with aspects of the invention, the update command can also be combined with any of the three commands that focus on editing a calendar entry (e.g., functions 4-6 described above with reference to Table 2), as discussed in further detail below.

At step 520, the user may choose to change a start and/or end time of an event. For example, the user may text the SMS command "E2c[start time].[end time]" to request that the SMScal change the time of a specified event (e.g., event E2). In embodiments, the SMScal may be configured to accept multiple time formats (e.g., 3 pm, 305 pm, 0305 pm 3:05 pm, 03:05, 1500, 15:00, etc.). Additionally, the change of time command may be combined with the update command "u" to move an event time and update all invitees within a single SMS command string, e.g., E2c3:15pm.4pmu running late, drs appointment. meeting moved to afternoon.

At step 525, the user may choose to open a line or event for participants to collaborate without the presence of the host or moderator. For example, the user may text the SMS command "E2o" to request that the SMScal input the user's hostcode at a specified event's (e.g., event E2) regular start time such that the participants can begin the event without the presence of the host or moderator. Additionally, the open line or event command may be combined with the update command "u" as discussed above to open a line or event and update all invitees within a single SMS command string, e.g., E2ou stuck in client mtg. about 20 mins late, start status call without me. In embodiments, the update message may be delivered verbally (in addition to or instead of the text message) over the conference call such that the participants may be able to start the event without the presence of the host or moderator.

At step 530, the user may choose to cancel an event. For example, the user may text the SMS command "E2x" to request that the SMScal cancel a specified event (e.g., event E2). Additionally, the cancel event command may be combined with the update command "u" as discussed above to cancel an event and update all invitees within a single SMS command string, e.g., E2xu In bed, sick with the flu. Sorry for the last minute cancellation. In embodiments, an automated cancelation alert or verbalized message may be configured to greet users dialing into a conference call in case the invitees did not receive the calendar update prior to dialing into the conference call.

At step 535, the user may choose to dial into an event as a host or participant. For example, the user may text the SMS command "E2h" to request that the SMScal call the user's mobile device and connect the user to a specified event (e.g., event E2). For example, a user may prompt the SMScal to call the user's mobile device, and when the call is answered by the user, the user is automatically connected to the specified event as though the user had called into the event directly with their host or participant code. In embodiments, this functionality may be available to participants if the host or moderator had listed the participant code in the event invitation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable hardware storage device having programming instructions configured to:

receive a first short message service (SMS) text only message via a contact number or email address assigned to a user, the first SMS text only message comprising a first SMS command to retrieve all of a current day's events from an electronic calendar of the user;

send all of the current day's events to a mobile device of the user via a second SMS text only message;

receive a third SMS text only message via the contact number or email address assigned to the user, the third SMS text only message comprising a second SMS command to manage the electronic calendar, wherein the second SMS command comprises an instruction to modify at least one pre-existing event of the current day's events; and execute the second SMS command such that the at least one pre-existing event is modified within the electronic calendar.

2. The method of claim 1, wherein:

the instruction comprises a request to cancel the at least one pre-existing event, reschedule the at least one pre-existing event, open a line to the at least one pre-existing event, or dial into the at least one pre-existing event; and executing the second SMS command comprises removing the at least one pre-existing event from the electronic calendar, rescheduling the at least one pre-existing event, opening the line to the at least one pre-existing event, or dialing a user into the at least one pre-existing event.

3. The method of claim 2, wherein the programming instructions are further configured to send an update SMS text message or update voice message to participants of the at least one pre-existing event such that the participants are informed of the cancellation of the at least one pre-existing event, the rescheduling of the at least one pre-existing event, or the line being opened for the at least one pre-existing event.

4. The method of claim 1, wherein:

the second SMS text only message comprises a designated character or series of characters assigned to the at least one pre-existing event; and the second SMS command includes the designated character or series of characters to identify the at least one pre-existing event as being an event to modify.

5. The method of claim 1, wherein the programming instructions are further configured to:
   receive another SMS text message comprising an SMS command comprising an instruction to retrieve details regarding the pre-existing event; and
   execute the SMS command such that the details of the pre-existing event are forwarded to the user.

6. The method of claim 1, wherein a service provider at least one of creates, maintains, deploys and supports the computer infrastructure.

7. The method of claim 1, wherein steps of claim 1, are provided by a service provider on a subscription, advertising, and/or fee basis.

8. A system implemented in hardware, comprising:
   a calendar manager tool implemented on a processor and configured to:
      receive a first short message service (SMS) text only message via a contact number or email address assigned to a user, the first SMS text only message comprising a first SMS command to retrieve all of a current day's events from an electronic calendar of the user;
      send all of the current day's events to a mobile device of the user via a second SMS text only message
      receive a third SMS text only message via the contact number or email address assigned to the user, the third SMS text only message comprising a second SMS command to manage the electronic calendar, wherein the second SMS command comprises an instruction to at least one of: cancel at least one pre-existing event of the current day's events, reschedule the at least one pre-existing event, open a line to the at least one pre-existing event, and dial into the at least one pre-existing event; and
      execute the second SMS command such that the at least one pre-existing event is at least one of: removed from the electronic calendar, the at least one pre-existing event is rescheduled, the line to the at least one pre-existing event is opened, and a user is dialed into the at least one pre-existing event.

9. The system of claim 8, further comprising a service provider server configured to:
   receive a request from the user to establish an account;
   provide access to the calendar manager tool; and
   assign the contact number or email address to the calendar manger tool or the electronic calendar.

10. The system of claim 9, wherein:
    the service provider server is further configured to receive personal information from the user to establish the account; and
    the calendar manager tool is further configured to receive user preferences including at least one of a number of maximum text messages that the calendar manager tool can send to the user in a day, preferred time and date formats, a number of maximum texts that the calendar manager tool can use to send details of the at least one pre-existing calendar event, and a time of day in which text messages may be sent by the calendar manager tool.

11. The system of claim 9, wherein the calendar manager tool is further configured to send an update SMS text message or update voice message to participants of the at least one pre-existing event such that the participants are informed of at least one of: the cancellation of the at least one pre-existing event, the rescheduling of the at least one pre-existing event, and the line being opened for the at least one pre-existing event.

12. The system of claim 8, wherein:
    the second SMS text only message comprises a designated character or series of characters assigned to the at least one pre-existing event; and
    the second SMS command includes the designated character or series of characters to identify the at least one pre-existing event as being an event to update, reschedule, open a line to, or dial into.

13. A computer program product comprising a computer readable hardware storage device having executable program instructions embodied in the computer readable hardware storage device, the program instructions comprising:
    program instructions to receive a first short message service (SMS) text only message via a contact number or email address assigned to a user, the first SMS text only message comprising a first SMS command to retrieve all of a current day's events from an electronic calendar of the user;
    program instructions to send all of the current day's events to a mobile device of the user via a second SMS text only message;
    program instructions to receive a third SMS text only message via the contact number or email address assigned to the user, the third SMS text only message comprising a second SMS command to manage the electronic calendar, wherein the second SMS command comprises an instruction to cancel, reschedule, or dial into at least one pre-existing event of the current day's events; and
    program instructions to execute the second SMS command such that the at least one pre-existing event is canceled, rescheduled, or dialed into.

14. The computer program product of claim 13, further comprising program instructions to send an update SMS text message or update voice message to participants of the at least one pre-existing event such that the participants are informed of the cancelation or the rescheduling of the least at least one pre-existing event.

15. The computer program product of claim 13, wherein:
    the second SMS text only message comprises a designated character or series of characters assigned to the at least one pre-existing event; and
    the second SMS command includes the designated character or series of characters to identify the at least one pre-existing event as being an event to update, reschedule, or dial into.

16. A computer system for managing an electronic calendar using short message service (SMS), the system comprising:
    a CPU, a computer readable memory and a computer readable storage media;
    program instructions to receive a first SMS text only message via a contact number or email address assigned to a user, the first SMS text only message comprising a first SMS command to retrieve all of a current day's events from an electronic calendar of the user;
    program instructions to send all of the current day's events to a mobile device of the user via a second SMS text only message;
    program instructions to receive a third SMS text only message via the contact number or email address assigned to the user, the third SMS text only message comprising a second SMS command to manage the electronic calendar, wherein the second SMS command comprises an instruction to modify at least one pre-existing event of the current day's events; and program instructions to execute the second SMS command such that the at least one pre-existing event is modified within the electronic calendar in accordance with the instruction, wherein the program instructions are stored on the computer readable storage media for execution by the CPU via the computer readable memory.

17. The computer system of claim 16, wherein:

the instruction comprises a request to open a line to the at least one pre-existing event or dial into the at least one pre-existing event; and executing the second SMS command comprises opening the line to the at least one pre-existing event, or dialing a user into the at least one pre-existing event.

18. The computer system of claim 17, further comprising program instructions to send an update SMS text message or update voice message to participants of the at least one pre-existing event such that the participants are informed of the line being opened for the at least one pre-existing event.

19. A method of deploying a system for managing an electronic calendar using short message service (SMS), comprising:

providing a computer infrastructure comprising a computing device, the computing device being configured to:

receive a first SMS text only message via a contact number or email address assigned to a user, the first SMS text only message comprising a first SMS command to retrieve all of a current day's events from an electronic calendar of the user;

send all of the current day's events to a mobile device of the user via a second SMS text only message;

receive a third SMS text only message via the contact number or email address assigned to the user, the third SMS text only message comprising a second SMS command to manage the electronic calendar, wherein the second SMS command comprises an instruction to cancel, reschedule, or dial into at least one pre-existing event of the current day's events in the electronic calendar; and execute the second SMS command such that the at least one pre-existing event is canceled, rescheduled, or dialed into.

* * * * *